United States Patent
Tsirkin et al.

(10) Patent No.: US 9,436,495 B2
(45) Date of Patent: Sep. 6, 2016

(54) PROTECTION AGAINST INTERRUPTS IN VIRTUAL MACHINE FUNCTIONS

(71) Applicant: Red Hat Israel, Ltd., Ra'anana (IL)

(72) Inventors: Michael Tsirkin, Yokneam Illit (IL); Paolo Bonzini, Turate (IT)

(73) Assignee: Red Hat Israel, Ltd., Ra'Anana (IL)

( * ) Notice: Subject to any disclaimer, the term of this patent is extended or adjusted under 35 U.S.C. 154(b) by 44 days.

(21) Appl. No.: 14/604,056

(22) Filed: Jan. 23, 2015

(65) Prior Publication Data
US 2016/0216985 A1 Jul. 28, 2016

(51) Int. Cl.
G06F 9/455 (2006.01)
G06F 9/48 (2006.01)

(52) U.S. Cl.
CPC ......... G06F 9/45558 (2013.01); G06F 9/4812 (2013.01); *G06F 2009/45583* (2013.01)

(58) Field of Classification Search
CPC .................................................. G06F 9/4812
USPC ............................................................ 718/1
See application file for complete search history.

(56) References Cited

U.S. PATENT DOCUMENTS

| | | | |
|---|---|---|---|
| 7,853,744 B2 * | 12/2010 | Mahalingam | G06F 9/4812 710/262 |
| 8,656,482 B1 | 2/2014 | Tosa et al. | |
| 8,832,688 B2 | 9/2014 | Tang et al. | |
| 2009/0019256 A1 * | 1/2009 | Kneebone | G06F 12/10 711/209 |
| 2009/0259870 A1 * | 10/2009 | Sharma | G06F 9/45533 713/400 |
| 2013/0042242 A1 * | 2/2013 | Kagan | G06F 9/45558 718/1 |
| 2013/0276057 A1 | 10/2013 | Smith et al. | |
| 2014/0173628 A1 | 6/2014 | Ramakrishnan Nair | |
| 2014/0189194 A1 | 7/2014 | Sahita et al. | |
| 2014/0189690 A1 | 7/2014 | Ramakrishnan Nair | |
| 2014/0283056 A1 | 9/2014 | Bachwani et al. | |

OTHER PUBLICATIONS

Mendel Rosenblum, "Virtual Machine Monitors: Current Technology and Future Trends", May 2005, IEEE Computer Society.*
Jason Franklin et al., "Remote Detection of Virtual Machine Monitors with Fuzzy Benchmarking", 2008.*
Andrew Whitaker et al., "Denali: Lightweight Virtual Machines for Distributed and Networked Applications", 2002.*
Nakajima et al., Intel Look Inside, Extending KVM Models Toward High-Performance NFV, Oct. 14, 2014 (28 pages).
Simple is Better, Thoughts on Hardware Virtualization Exception (#VE), May 18, 2014 (3 pages).

* cited by examiner

*Primary Examiner* — Wei Zhen
*Assistant Examiner* — Lanny Ung
(74) *Attorney, Agent, or Firm* — K&L Gates LLP (57) ABSTRACT

A system, methods, and apparatus for protection against interrupts in virtual machine functions are disclosed. A hypervisor determines a first location in the memory, corresponding to a physical address of the virtual machine function. The hypervisor then determines a second location in the memory of the virtual machine function, where the second location is offset from the first location. The hypervisor modifies the virtual machine function at the second location in the memory to include checking code. The virtual machine function is executed and the checking code is executed while the virtual machine function is executing. While executing the checking code, the hypervisor determines whether interrupts are disabled on a virtual machine. Responsive to determining that interrupts are enabled on the virtual machine, disabling the interrupts on the virtual machine and/or aborting the virtual machine function.

20 Claims, 6 Drawing Sheets

Default Page Table 181

| 310A x0001 | 320A Read-Only | 330A x03FF |
|---|---|---|
| 310B x0002 | 320B Read-Write | 330B x040F |
| 310C x0003 | 320C Executable | 330C x041F |
| 310D x0004 | 320D Executable Only | 330D x042F |
| 310E x0005 | 330E Inaccessible | 330E x043F |

Alternate Page Table 182

| 340A x0001 | 350A Read-Write | 360A x01AF |
|---|---|---|
| 340B x0002 | 350B Read-Write | 360B VM Function x01FF |
| 340C x0003 | 350C Read-Write | 360C VM Function x024F |
| 340D x0004 | 350D Read-Write | 360D VM Function x029F |
| 340E x0005 | 350E Read-Write | 360E VM Function x02EF |
| 340F x0006 | 350F Read-Write | 360F x033F |

FIG. 3

Alternate Page View 420

- 440A Read-Write
- 440B VM Function Read-Write
- 440C VM Function Checking Code Read-Write
- 440D VM Function Memory Access Code Read-Write
- 440E VM Function Read-Write
- 440F Read-Write Default Page View 410

- 430A Read-Only
- 430B Read-Write
- 430C Executable
- 430D Executable Only
- 430E Inaccessible

PROTECTION AGAINST INTERRUPTS IN VIRTUAL MACHINE FUNCTIONS

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as hypervisor, above the hardware and below the virtual machines. A hypervisor may run directly on the server hardware without an operating system beneath it or as an application running under a traditional operating system. A hypervisor may virtualize the physical layer and provide interfaces between the underlying hardware and virtual devices of virtual machines. Processor virtualization may be implemented by the hypervisor scheduling time slots on one or more physical processors for a virtual machine, rather than a virtual machine actually having a dedicated physical processor.

A virtualized computer system may provide routing and processing of interrupts. An interrupt generally refers to an event that requires a processor to execute event-specific instructions, which might involve the processor's holding the current thread of execution and/or switching contexts.

SUMMARY

The present disclosure provides a new and innovative system, methods and apparatus for protection against interrupts in virtual machine functions.

In an example embodiment, a system includes memory, one or more physical processors, a virtual machine executing on the one or more physical processors, and a hypervisor executing on the one or more physical processors. The hypervisor determines a first location in the memory, corresponding to a physical address of the virtual machine function. The hypervisor then determines a second location in the memory of the virtual machine function, where the second location is offset from the first location in the memory of the virtual machine function. The hypervisor modifies the virtual machine function at the second location in the memory to include checking code. The virtual machine function is executed and the checking code is executed while the virtual machine function is executing. While executing the checking code, the hypervisor determines whether interrupts are disabled on a virtual machine. Responsive to determining that interrupts are enabled on the virtual machine, at least one of disabling, by the hypervisor using the checking code, the interrupts on the virtual machine and aborting, by the hypervisor using the checking code, the virtual machine function.

Additional features and advantages of the disclosed method and apparatus are described in, and will be apparent from, the following Detailed Description and the Figures.

DETAILED DESCRIPTION OF EXAMPLE EMBODIMENTS

Figure 1:
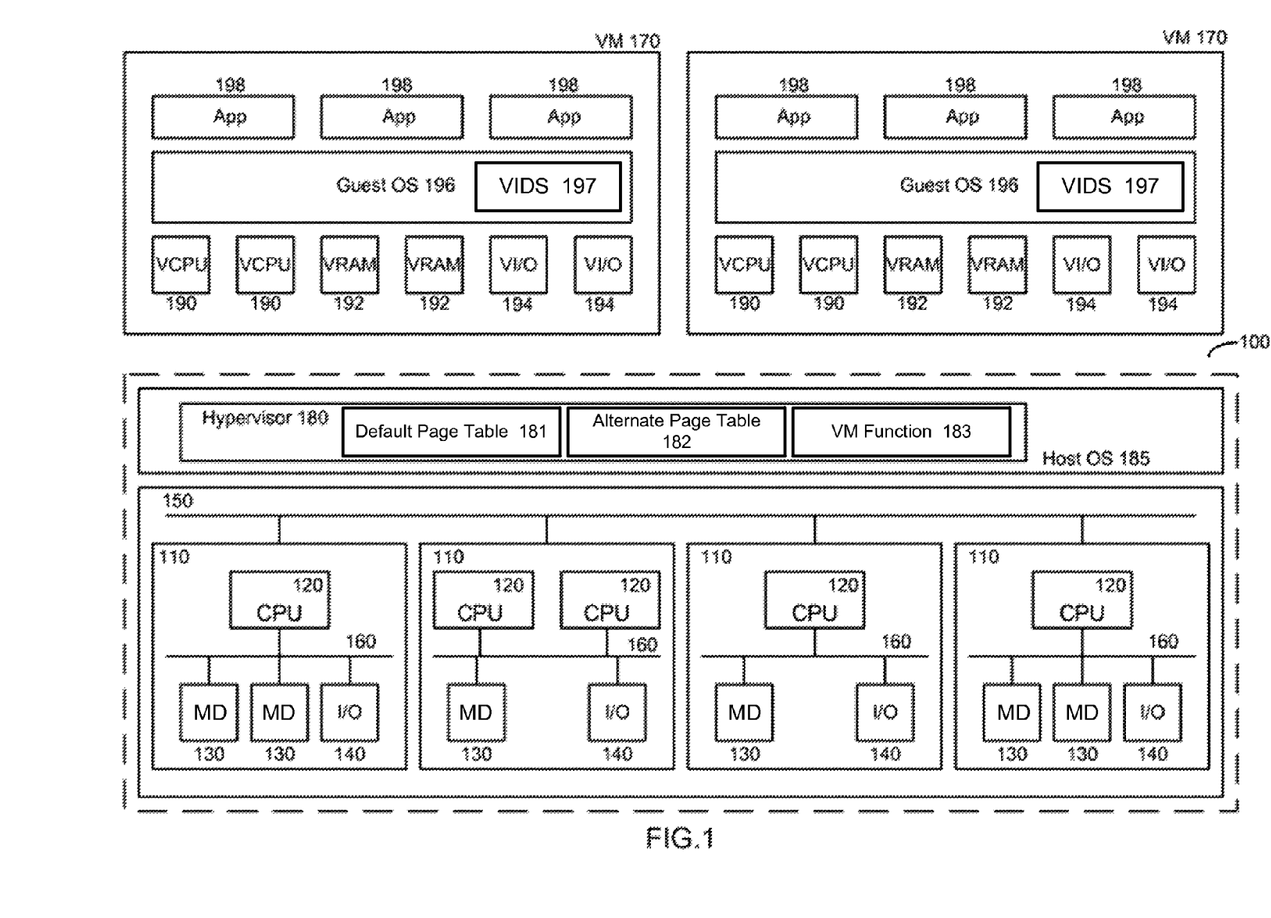
FIG. 1 is a block diagram of an example multiprocessor computer system according to an example embodiment of the present disclosure.

FIG. 1 depicts a high-level component diagram of an example multiprocessor (or host) computer system 100 in accordance with one or more aspects of the present disclosure. The computer system 100 may include one or more interconnected nodes 110. Each node 110 may in turn include one or more physical processors 120 communicatively coupled to memory devices (MD) 130 and input/output (I/O) devices 140.

As used herein, physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device refers to a volatile or non-volatile memory device, such as RAM, ROM, EEPROM, or any other device capable of storing data. As discussed herein, I/O device refers to a device capable of providing an interface between one or more processor pins and an external device capable of inputting and/or outputting binary data.

Processors 120 may be interconnected using a variety of techniques, ranging from a point-to-point processor interconnect, to a system area network 150, as shown in FIG. 1, such as an Ethernet-based network. Local connections within each node 110, including the connections between a processor 120 and a memory 130 and between a processor 120 and an I/O device 140 may be provided by one or more local buses 160 of suitable architecture, for example, peripheral component interconnect (PCI).

As noted above, computer system 100 may run multiple virtual machines 170, by executing a software layer (e.g., hypervisor 180) above the hardware and below the virtual machines, as schematically shown in FIG. 1. In one illustrative example, the hypervisor 180 may be a component of the operating system 185 executed by the computer system 100. Alternatively, the hypervisor 180 may be provided by an application running under the host operating system 185, or may run directly on the host computer system 100 without an operating system beneath it. The hypervisor 180 may virtualize the physical layer, including processors, memory, and I/O devices, and present this virtualization to virtual machines 170 as virtual devices, including virtual processors (VCPU) 190, virtual memory 192, and virtual I/O devices 194.

Figure 2:
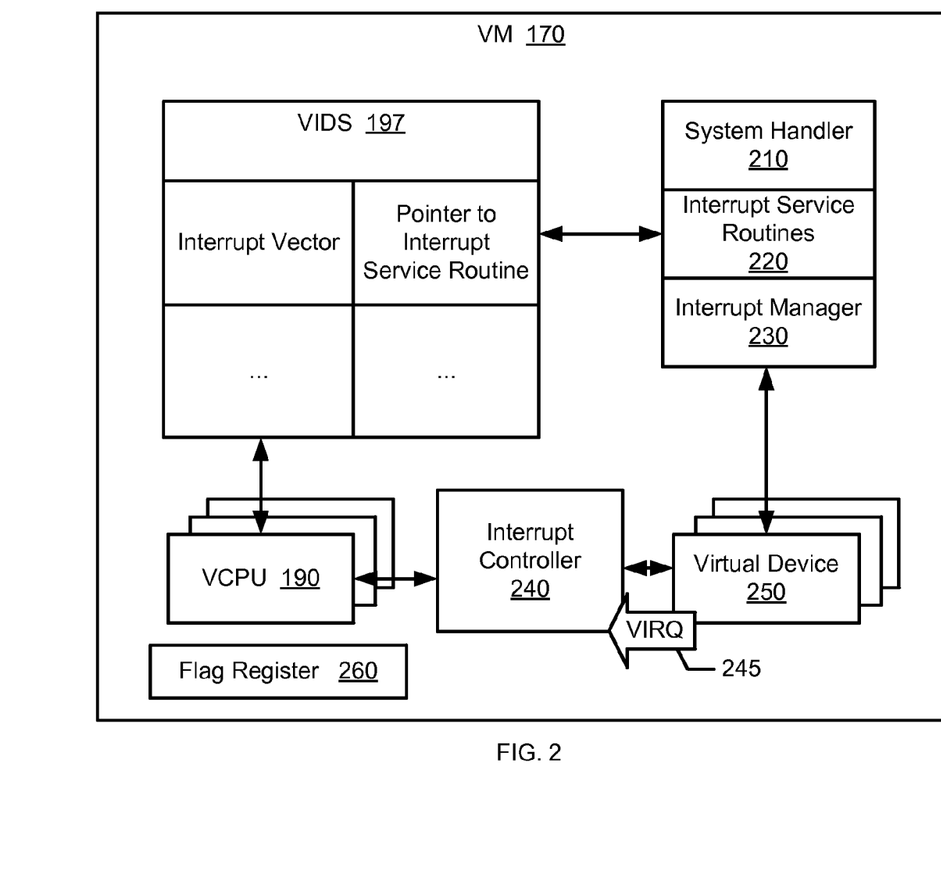
FIG. 2 is a block diagram of an example virtual machine including an interrupt data structure according to an example embodiment of the present disclosure.

A virtual machine 170 may execute a guest operating system 196 which may utilize the underlying virtual processors 190, virtual memory 192, and virtual I/O devices 194. One or more applications 198 may be running on a virtual machine 170 under the guest operating system 196. The guest operating system may include a virtual interrupt data structure (VIDS) 197. Example embodiments of the VIDS 197 are described in greater detail below and as shown in FIG. 2.

A virtual machine 170 may include multiple virtual processors (VCPU) 190. Processor virtualization may be implemented by the hypervisor 180 scheduling time slots on one or more physical processors 120 such that from the guest operating system's perspective those time slots are scheduled on a virtual processor 190.

The hypervisor 180 may provide one or more virtual machine functions (VM Functions 183) to a virtual machine 170. The code that the VM Function 183 runs on the physical processor(s) 120 may utilize the resources of host operating system (Host OS) 185, such as the memory devices 130, and the input/output devices 140 as well as the resources of one or more of the virtual machines 170 including the virtual processors 190, the virtual memory 192, and the virtual I/O devices 194. For example, the VM Function 183 may be called by a VM 170 to transfer data to, or access the resources of another VM 170. By contrast, each VM 170 may be limited to the use of its own resources including its VCPUs 190, virtual memory 192, and virtual I/O devices 194 unless it invokes a VM Function 183 as described below.

In an example embodiment, the VM Function 183 may be invoked for a VM 170, by the guest OS 196 that is running on it. In an example embodiment, a VM Function 183 may only be invoked if hypervisor 180 provides permission or grants a request. For example, a VM 170 or guest OS 196 may invoke a VM Function to handle a task more efficiently or using greater resources than are presently available to the VM 170 or guest OS 196. In an example embodiment, the hypervisor 180 may also deny the request by causing an undefined opcode exception or a general protection fault exception whenever the VM Function 183 is invoked.

The hypervisor may also include a default page table 181 and an alternate page table 182. Example embodiments of these data structures are described in greater detail below and as shown in FIG. 3.

FIG. 2 illustrates an example embodiment of a virtual machine 170. During operation, an event may be triggered by the operation of virtual device 250. The virtual device 250 can report the event by sending a virtual interrupt request (VIRQ 245) to one of the VCPUs 190 via an interrupt controller 240. The VIRQ 245 is sent with an interrupt vector that is assigned to the event. The VIRQ 245 is passed to a system handler 210, which consults a virtual interrupt data structure (VIDS) 197, using the interrupt vector as an index. The VIDS 197 associates each interrupt vector with an interrupt service routine 220. For example, the VIDS 197 is indexed by interrupt vectors, allowing the system handler 210 to use interrupt vectors to locate pointers to the corresponding interrupt service routines 220. The interrupt service routines 220 may then handle the event by causing the VCPU 190 to execute event handling code to perform appropriate operations. The virtual machine 170 may include a flag register 260 for VCPU 190. The flag register 260 may store one or more flags governing the status of VCPU 190. For example, the flag register 260 may include an interrupt flag that governs the status of interrupts to the VM 170. In an example embodiment, if an interrupt flag is set, interrupts to the VM 170 are enabled and the VCPU 190 will handle interrupts normally, and if an interrupt flag is cleared, interrupts to the VM 170 are disabled and the VCPU 190 will ignore interrupts that are received. An interrupt flag may be set using a set interrupts instruction and may be cleared using a clear interrupts instruction. In an example embodiment, a flag register 260 may be part of a larger register.

The present disclosure is not limited to the structure of the system illustrated in FIG. 2. In an example embodiment, the virtual device 250 may be external to the VM 170 and/or the VIDS 197 may be stored externally to the VM 170. In another example embodiment, the system handler 210, interrupt service routines 220, and interrupt manager 230 may be on the hypervisor 180. In yet another example embodiment, the status of the VCPU 190 may be stored somewhere other than a flag register 260.

Figure 3:
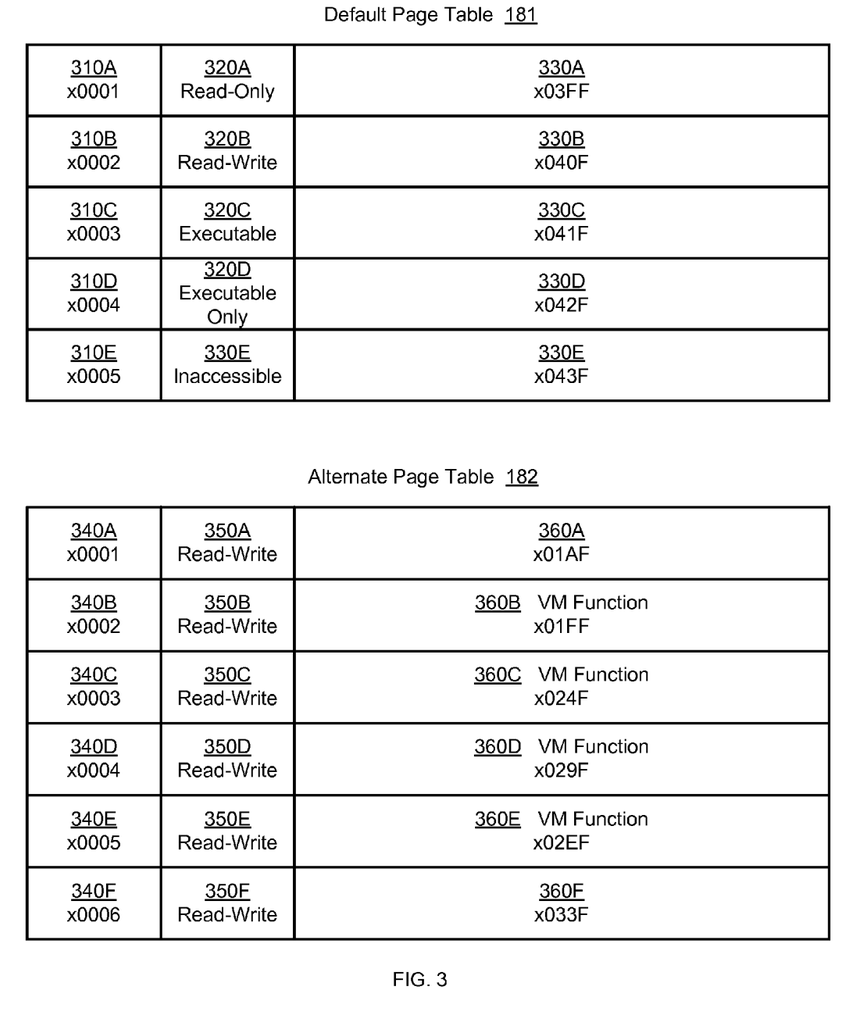
FIG. 3 a block diagram of an example default page table and alternate page table according to an example embodiment of the present disclosure.
Figure 4:
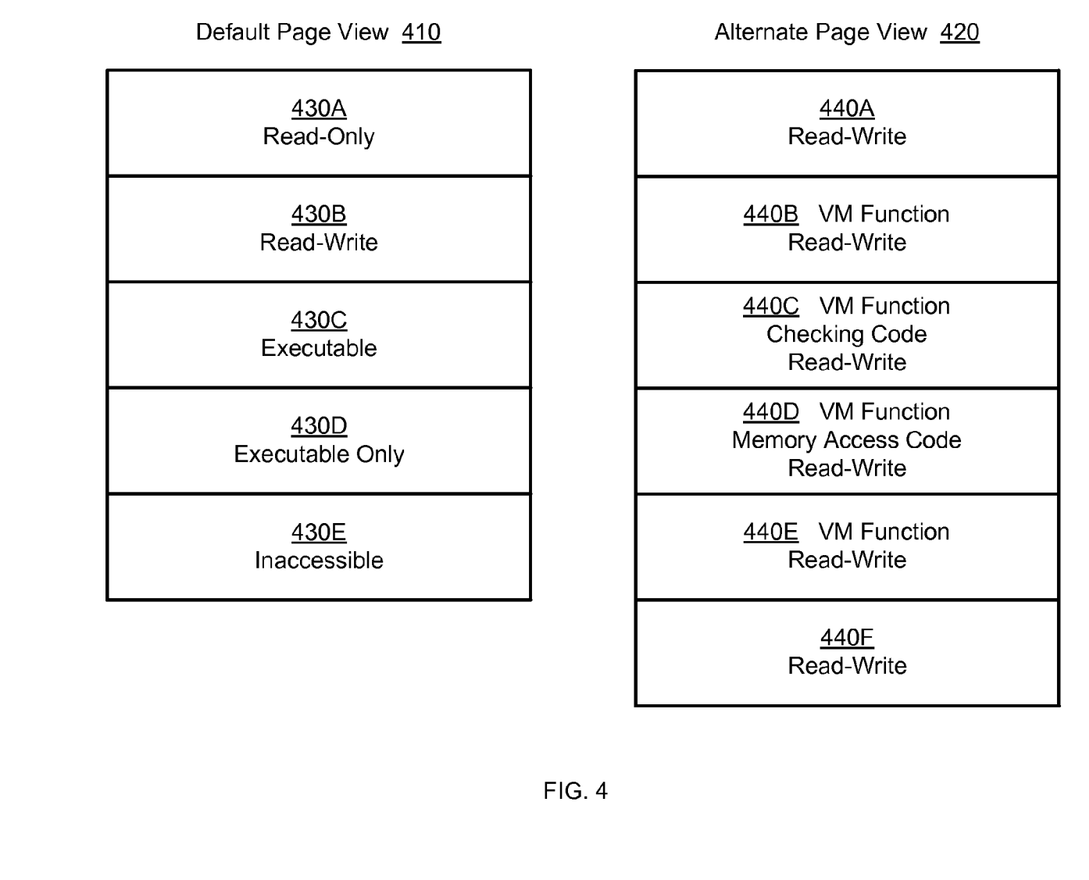
FIG. 4 is a block diagram of example page views and pages according to an example embodiment of the present disclosure.

FIG. 3 illustrates a default page table 181 and an alternate page table 182 according to an example embodiment of the present disclosure. In general, the hypervisor 180 manages the memory usage of the VMs 170. Both virtual memory and physical memory may be divided into pages which are identified with a unique number (e.g., Page Frame Number (PFN) 310A-E or 340A-F). Example embodiments of pages and page views are described in greater detail below and as shown in FIG. 4.

A page table is a data structure used by the hypervisor 180 to store a mapping of physical addresses for the guest (e.g., used by the guest OS 196 on VM 170) to physical addresses for the host (e.g., used by the host hardware platform 100). Accordingly, address translation from guest-physical to host-physical memory addresses is handled using page tables. For example, each process or application operating within the VMs 170 may be given the impression that there is a contiguous section of memory available, when in reality, the available memory may be spread across various memory devices 130.

The page tables 181 and 182 comprise entries that map a virtual PFN 310A-E (or 340A-F) with a physical address 330A-E (or 360A-F). The page tables 181 and 182 may be used together with any paging data structure used by the VMs 170 to support translation from virtual to physical addresses (e.g., 32-bit linear address space using a two-level hierarchical paging structure, Physical Address Extension mode, INTEL Extended Memory 64 Technology mode, etc.).

In an example embodiment, page tables 181 and 182 may also include a protection identifier 320A-E (or 350A-F). The protection identifier 320A-E (or 350A-F) indicates the access protection status of a page for the page view described by the page table. A protection status may used to define for example that a given page is writable (or read-write), write-protected (or read-only), executable (or executable and readable), executable only, inaccessible (or non-present), etc. For example, in FIG. 3, the page associated with virtual PFN x0001 and memory location x03FF has been defined in default page table 181 as 'Read-Only'. The page associated with virtual PFN x0001 is associated with memory location x01AF in alternate page table 182 and has been defined as 'Read-Write'. The hypervisor 180 may be used to control to protection status of pages. In addition, in an example embodiment, the page tables 181 and 182 may include additional information not shown in FIG. 3 including statistics information, background information, dirty identifiers which indicate that modifications to a page must be written back to disk, etc.

In an example embodiment, one or more default page tables 181 may be maintained by the hypervisor 180 for each of the VMs 170 which maps virtual addresses to physical addresses that are accessible by each of the VMs 170. For example, the page table entries in the default page table 181 corresponding to the virtual PFNs (e.g. 310A-E) of an interrupt data structure (e.g., VIDS 197) on the VM 170 is accessed by physical CPU 120 when looking up pointers to interrupt service routines. The pointers to these interrupt service routines themselves provide a virtual PFN that is consulted in the default page table 181 to convert the pointers to physical addresses of the host computer system 100. In an example embodiment, in order to convert a virtual PFN to a host physical address, the hypervisor 180 may also consult page table 181, together with any paging data structure that the VMs 170 use to support translation from virtual to physical addresses. One or more alternate page tables 182 may be maintained by the hypervisor 180 for each of one or more VM Functions 183 which maps virtual addresses to physical addresses that are accessible by each of the VM Functions 183. For example, a portion of the entries in an alternate page table 182 (e.g., 360B-360E) may correspond to physical pages at which the VM Function 183 is located. In an example embodiment, one or more entries in alternate page table 182 may additionally be maintained by the hypervisor 180 for an interrupt data structure (e.g. VIDS 197) on the VM 170. As illustrated in FIG. 3, in an example embodiment, an alternate page table 182 may be more expansive than a default page table 181 in order to permit the VM Functions 183 to access a larger set of memory resources than the VMs 170 have access to. However, the sizes of different page tables may vary and that the degree of overlap between different page tables may vary (e.g., there may be no overlap).

FIG. 4 illustrates page views and pages, for example a default page view 410, an alternate page view 420, and pages 430A-D and 440A-F, in accordance with an example embodiment of the present disclosure. As noted above, a page may be a portion of physical or virtual memory designated for storing data. As used herein, a page view denotes a mapping from guest-physical addresses to host-physical addresses. For example, a default page view 410 is a page view that is referenced by a default page table 181. In an example embodiment, the default page view 410 may denote the mapping from virtual PFNs of a VM 170 to host-physical addresses, as used during normal execution of the virtual machine. An alternate page view 420 is a page view that is referenced by an alternate page table 182, as used during execution of the VM Function 183. In an example embodiment, the alternate page view 420 may denote a mapping from addresses designated for use by the VM Function 183 to host-physical addresses. In the illustrated example in FIG. 4, only a portion of pages on alternate page view 420 are designated for use by the VM Function 183 (e.g., 440B-E) and the remaining pages (e.g., 440A and 440F) refer to locations in the alternate page view 420 that are outside the memory location of the VM Function 183. In an example embodiment, memory that is designated for use by the VM Function 183 refers to memory at which the VM Function 183 is stored. In another example embodiment, memory that is designated for use by the VM Function 183 refers to memory that is generally allocated or accessible to the VM Function 183.

As illustrated in FIG. 4, pages (e.g., 430A and 440A) may be defined by access protections (described above in more detail) such as 'read-only' or 'readable-writable' in accordance with their respective page table protection identifiers (e.g., 320A and 350A). A VM Function 183 may change the mapping of guest-physical addresses to host-physical addresses, e.g., page views 410 or 420, by changing the page tables 181 or 182 that the processor 120 uses to perform memory accesses in the VM 170.

Figure 5:
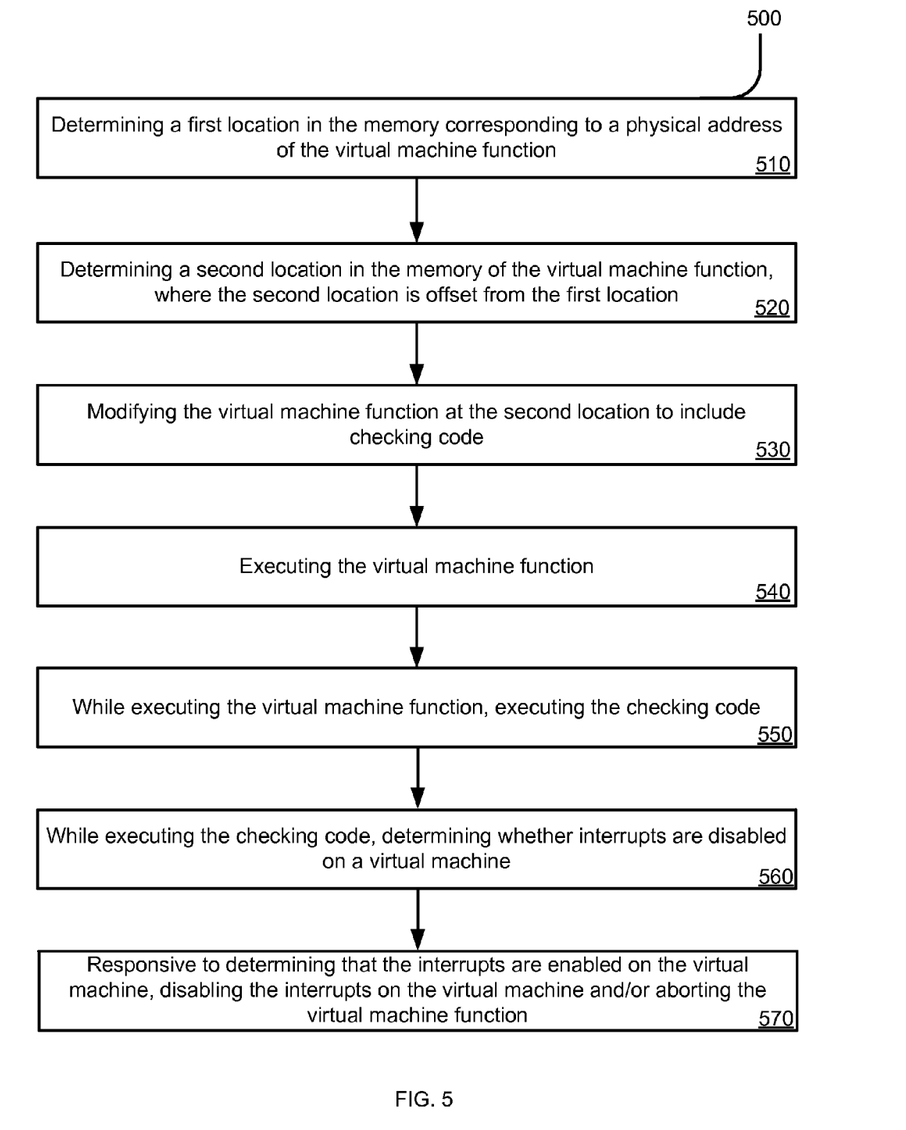
FIG. 5 is a flowchart illustrating an example process for protection against interrupts in virtual machine functions according to an example embodiment of the present disclosure

FIG. 5 illustrates a flowchart of an example method 500 for protection against interrupts in virtual machine functions. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software (such as is run on a general purpose computer system or a dedicated machine), or a combination of both. In an example embodiment, the method is performed by a hypervisor (e.g., hypervisor 180 of FIG. 1).

The example method 500 starts and the hypervisor 180 determines a first location in the memory, corresponding to a physical address of the virtual machine function 183 (block 510). In an example embodiment, the hypervisor 180 may determine the first location in the memory by reading a page table (e.g., alternate page table 182) entry from the guest page tables (e.g. a Physical Address Extension page table, or an INTEL Extended Memory 64 Technology page table). In another example embodiment, the hypervisor 180 may use a fixed location in memory.

Prior to this step, the hypervisor 180 may determine that a virtual machine function 183 or any associated resources are vulnerable to interrupts. In an example embodiment, the hypervisor 180 may undertake example method 500 when a VM 170 is initialized. In another example embodiment, the hypervisor 180 may undertake example method 500 responsive to determining that a guest OS 196 or VM 170 requires access to a VM Function 183 or its resources in an alternate view, for example on the first invocation of the VM Function 183. In yet another example, the hypervisor 180 may undertake example method 500 when it receives a request from guest OS 196 or VM 170 to access a VM Function 183. In an example embodiment, a page table corresponding to a virtual machine function 183 refers to a page table that includes at least one entry mapping addresses designated to the VM Function 183 to host physical addresses. In an example embodiment, a location in memory may refer to one address. In another example embodiment, a location in memory may refer to a block of addresses. In yet another example embodiment, a location in memory may refer to a multiple blocks of addresses that may be contiguous or may be dispersed across different areas of physical memory.

The hypervisor 180 determines a second location in the memory of the virtual machine function 183, where the second location is offset from the first location (block 520). The hypervisor 180 modifies the virtual machine function at the second location to include checking code (block 530). In an example embodiment, the hypervisor 180 overwrites data occupying the memory at the second location to include checking code.

As used herein, an offset refers to a number of address locations added to a base address to get another address. For example, an offset of x0010 from a memory location x0001 would equate to memory location x0011. In an example embodiment, the hypervisor 180 may strategically determine the second location to be an address or group of addresses at which to include checking code that either reduces or minimizes the risk that a system resource will crash due to an injection of a VIRQ 245 to VM 170 during the execution of the virtual machine function 183. For example, the second location may be selected to be an address or a group of addresses that is sequentially prior to an instruction or a function that accesses a computer system 100 resource such as CPU 120, memory device 130, I/O 140 or a virtual machine 170 resource such as VCPU 190, VRAM 192, VI/O 194, Guest OS 196, or a virtual machine application 198. In an example embodiment, the hypervisor 180 may select the second location to be an address or a group of addresses that is prior to an instruction or a function that accesses a memory resource. For example, the selected secondary location may be substantially immediately prior to an instruction or a function that accesses a memory resource. In another example embodiment, the hypervisor 180 may select the second location to be an address or a group of addresses that is prior to an instruction or a function that switches to alternate page view 420. For example, the selected secondary location may be substantially immediately prior to an instruction or a function that switches to alternate page view 420.

In another example embodiment, the hypervisor 180 may determine one or more additional locations at which to include checking code. For example, the hypervisor may determine a third location to be an address or group of addresses that is sequentially prior to a different instruction or function that accesses a computer system 100 or virtual machine 170 resource. In yet another example embodiment, the hypervisor 180 may periodically determine one or more locations in the memory designated for use by the virtual machine function 183 at which to include checking code. In this manner, the hypervisor 180 may dynamically protect computer system 100 and VM 170 resources even if changes are made to the VM Function 183.

In an example embodiment, hypervisor 180 may use a predefined offset to determine the second location in memory at which to load into and initialize code. For example, hypervisor 180 may use a predefined offset to load into a page (e.g., 440C) within the alternate page view 420 and initialize checking code therein. Page 440C is shown by way of example to be immediately preceding a page 440D corresponding to memory access code in the VM Function 183. The illustrated embodiment in FIG. 4 shows that the checking has been initialized in page 440C. However, in other example embodiments the hypervisor 180 may load into memory and initialize the checking code at locations different from the illustrated embodiments. In another embodiment, instead of using a predefined offset, the hypervisor 180 may determine an offset by reading VM Function 183 to determine the second location at which to include checking code. In yet another embodiment, the hypervisor 180 may determine a location at which to include checking code without first determining a first location and an offset.

The hypervisor 180 executes the virtual machine function 183 (block 540). While executing the virtual machine function 183, the hypervisor executes the checking code (block 550). In an example embodiment, checking code may be configured to determine whether interrupts are disabled. Accordingly, while executing the checking code, the hypervisor 180 employs the checking code to determine whether interrupts are disabled on a virtual machine 170 (block 560).

In an example embodiment, if the checking code determines that interrupts are disabled on a virtual machine 170, the hypervisor 180 will continue executing the VM Function 183 normally (not shown). In another example embodiment, illustrated in FIG. 5, if the checking code determines that the interrupts on VM 170 are enabled, the hypervisor 180 may disable the interrupts on the VM 170 and/or abort the virtual machine function 183 (block 570). In an example embodiment, the hypervisor 180 may both disable interrupts on the VM 170 and abort the VM Function 183. In another example embodiment, the hypervisor 180 may disable interrupts on the VM 170 and then continue and complete execution of the VM Function 183 and then re-enable the interrupts on the VM 170. In yet another example embodiment, the hypervisor 180 may abort the VM Function 183 without disabling the interrupts on the VM 170.

In an example embodiment, the checking code may include one or more instructions to load a flag register 260 of the VM 170 and read the flag register 260 to determine a status of an interrupt flag. In an example embodiment, the checking code may determine that interrupts on the VM 170 are disabled by determining that the interrupt flag of flag register 260 is cleared. In another example embodiment, the checking code may determine that interrupts on the VM 170 are enabled by determining that the interrupt flag of flag register 260 is set.

In an example embodiment, disabling the interrupts includes executing a clear interrupt instruction on the VM 170 and clearing the interrupt flag in the flag register 260. In an example embodiment, enabling or re-enabling the interrupts includes executing a set interrupt instruction on the VM 170 and setting the interrupt flag in the flag register 26.

In an example embodiment, aborting the VM Function 183 causes the VM function 183 to halt execution of the VM Function 183. In an example embodiment, aborting the VM Function 183 causes the VM Function 183 to stop execution of a VCPU 190 and/or exit to the hypervisor 180. The hypervisor 180 may then execute instructions to return an error message to the VM 170 and/or execute the remaining code of the VM Function 183 on a physical CPU 120, and deliver an interrupt. The VCPU 190 may then restart execution using a default page view 410.

In another example embodiment, aborting the VM Function 183 causes the VM Function 183 to return prior to completing one or more tasks. In yet another example embodiment, the virtual machine function 183 may be caused to abort by modifying one or more permissions of the page table (e.g., alternate page table 182) corresponding to VIDS 197. For example, the code may modify one or more protection identifiers (e.g., 350B-E) corresponding to entries of a page table (e.g., alternate page table 182) associated with the VIDS 197 to render the corresponding pages non-readable.

Modifying a VM Function 183 to include checking code as described in the present disclosure, significantly limits the access to virtual and physical resources of a computer system 100 by the source of an interrupt (e.g., a VM 170, guest OS 196, application 198, physical or virtual devices, malicious code, etc.) through the use of an interrupt data structure 197. Moreover, injecting interrupts via a virtual machine while a virtual machine function is executing may cause one or more VMs, host OS's, or guest OS's to crash, for example, if the interrupt data structure 197 points to code in memory that adversely affects execution of code for VM Function 183, or accesses resources that are not available in a default page view 410, but which are available in an alternate page view 420. The present disclosure advantageously protects a computer system 100 from the above described problems. Furthermore, the present disclosure advantageously allows for dynamically protecting against interrupts before they occur and generally provides for a more robust system.

Figure 6:
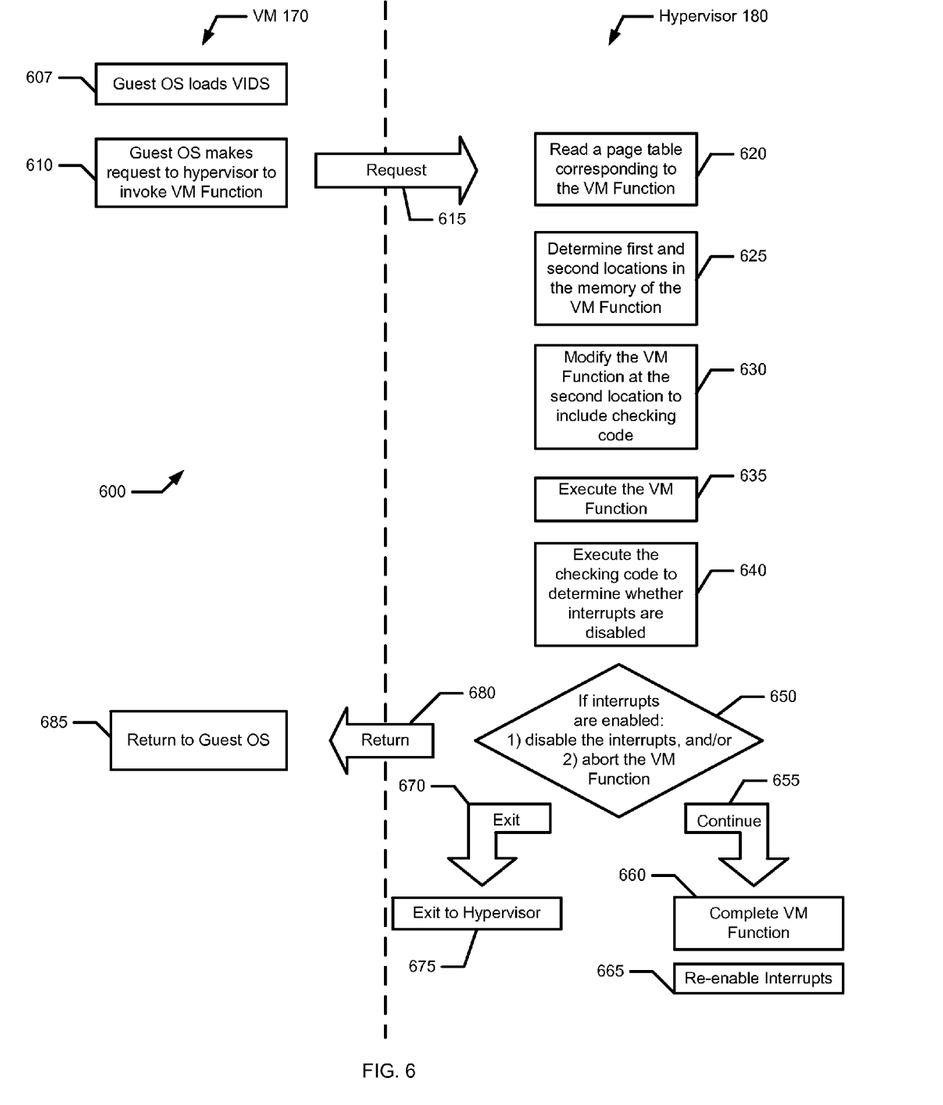
FIG. 6 is a flow diagram illustrating a guest operating system and hypervisor according to an example embodiment of the present disclosure.

FIG. 6 illustrates a flow diagram of an example process 600 including a VM 170 and hypervisor 180 in accordance with an example embodiment of the present disclosure. In the illustrated example embodiment, the guest OS 196 or VM 170 loads a VIDS 197 on the VM 170 (block 607). The guest OS 196 or VM 170 sends a request to the hypervisor 180 to invoke a virtual machine function 183 (block 610). This request is transmitted to the hypervisor 180 (block 615). Responsive to receiving the request 615, the hypervisor 180 reads a page table (e.g., alternate page table 182) corresponding to the VM Function 183 that was referenced in the request 615 (block 620). The hypervisor 180 determines a first location in the memory, corresponding to a physical address of the VM Function 183 and a second location offset from the first location (block 625). In another example embodiment, the hypervisor 180 determines a first location in the memory without first reading a page table (e.g., alternate page table 182) corresponding to the VM Function 183 (not shown). In yet another example embodiment, no request is sent to the hypervisor 180 by the guest OS 196 or VM 170 and the hypervisor 180 may still read a page table (e.g., alternate page table 182) corresponding to the VM Function 183 and determine first and second locations in the memory of the VM Function 183 (not shown). The hypervisor 180 modifies the VM Function 183 at the second location (e.g. 440C) to include checking code (block 630). The hypervisor 180 executes the VM Function 183 (block 635). The hypervisor 180 then executes the checking code prior to completing the execution of the VM Function 183 to determine whether interrupts are disabled (block 640). If the interrupts are enabled, the hypervisor 180 disables the interrupts and/or aborts the VM Function 183. In an example embodiment, after disabling the interrupts, the hypervisor 180 may then continue (block 655) the execution of the VM Function 183 and then complete the execution of the VM Function 183 (block 660). The hypervisor 180 may then re-enable the interrupts on the VM 170 (block 665). In an example embodiment, the hypervisor 180 may abort the VM Function 183 by causing a return (block 680) to guest OS 196 (block 685). In yet another example embodiment, the hypervisor 180 may abort the VM Function 183 by causing an exit (block 670) to the hypervisor 180 (block 675). In an example embodiment, after an exit to the hypervisor 180 occurs, the hypervisor 180 may execute a variety of instructions including instructions to cause a return to the guest OS 196 or VM 170.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first exemplary aspect of the present disclosure, a system comprises a memory, one or more processors coupled to the memory, a virtual machine executing on the one or more processors, and a hypervisor executing on the one or more processors to determine, by the hypervisor, a first location in the memory, corresponding to a physical address of a virtual machine function, determine, by the hypervisor, a second location in the memory of the virtual machine function, wherein the second location in the memory is offset from the first location in the memory of the virtual machine function, modify, by the hypervisor, the virtual machine function at the second location in the memory to include checking code, execute, by the hypervisor, the virtual machine function, while executing the virtual machine function, execute, by the hypervisor, the checking code, while executing the checking code, determine, by the hypervisor using the checking code, whether interrupts are disabled on a virtual machine, and responsive to determining that the interrupts are enabled on the virtual machine, at least one of disable, by the hypervisor using the checking code, the interrupts on the virtual machine and abort, by the hypervisor using the checking code, the virtual machine function. In accordance with another exemplary aspect of the present disclosure, which may be used in combination with the first aspect, the hypervisor determines the second location in the memory by determining an address at which to include the checking code. In accordance with another exemplary aspect of the present disclosure, which may be used in combination with any one or more of the preceding aspects, the second location includes an address substantially immediately prior to an instruction to access a memory resource. In accordance with another exemplary aspect of the present disclosure, which may be used in combination with any one or more of the preceding aspects, the second location includes an address substantially immediately prior to an instruction to to switch to an alternate page view. In accordance with another exemplary aspect of the present disclosure, which may be used in combination with any one or more of the preceding aspects, the hypervisor determines whether interrupts are disabled by loading a flag register of the virtual machine and reading the register to determine a status of an interrupt flag. In accordance with another exemplary aspect of the present disclosure, which may be used in combination with any one or more of the preceding aspects, disabling the interrupts includes executing a clear interrupt instruction on the virtual machine. In accordance with another exemplary aspect of the present disclosure, which may be used in combination with any one or more of the preceding aspects, responsive to disabling the interrupts on the virtual machine, completing the execution of the virtual machine function and re-enabling the interrupts on the virtual machine. In accordance with another exemplary aspect of the present disclosure, which may be used in combination with any one or more of the preceding aspects, aborting the virtual machine function includes at least one of exiting to the hypervisor, jumping to the end of the virtual machine function, and returning to the virtual machine.

In a second exemplary aspect of the present disclosure, a method comprises determining, by a hypervisor executing on a computer system, a first location in memory, corresponding to a physical address of a virtual machine function, determining, by the hypervisor, a second location in the memory of the virtual machine function, wherein the second location in the memory is offset from the first location in the memory of the virtual machine function, modifying, by the hypervisor, the virtual machine function at the second location in the memory to include checking code, executing, by the hypervisor, the virtual machine function, while executing the virtual machine function, executing, by the hypervisor, the checking code, while executing the checking code, determining, by the hypervisor using the checking code, whether interrupts are disabled on a virtual machine, and responsive to determining that the interrupts are enabled on the virtual machine, at least one of disabling, by the hypervisor using the checking code, the interrupts on the virtual machine and aborting, by the hypervisor using the checking code, the virtual machine function. In accordance with another exemplary aspect of the present disclosure, which may be used in combination with any one or more of the preceding aspects, the hypervisor determines the second location in the memory by determining an address at which to include the checking code. In accordance with another exemplary aspect of the present disclosure, which may be used in combination with any one or more of the preceding aspects, the second location includes an address substantially immediately prior to an instruction to access a memory resource. In accordance with another exemplary aspect of the present disclosure, which may be used in combination with any one or more of the preceding aspects, the second location includes an address substantially immediately prior to an instruction to to switch to an alternate page view. In accordance with another exemplary aspect of the present disclosure, which may be used in combination with any one or more of the preceding aspects, the hypervisor determines whether interrupts are disabled by loading a flag register of the virtual machine and reading the register to determine a status of an interrupt flag. In accordance with another exemplary aspect of the present disclosure, which may be used in combination with any one or more of the preceding aspects, disabling the interrupts includes executing a clear interrupt instruction on the virtual machine. In accordance with another exemplary aspect of the present disclosure, which may be used in combination with any one or more of the preceding aspects, responsive to disabling the interrupts on the virtual machine, completing the execution of the virtual machine function and re-enabling the interrupts on the virtual machine. In accordance with another exemplary aspect of the present disclosure, which may be used in combination with any one or more of the preceding aspects, aborting the virtual machine function includes at least one of exiting to the hypervisor, jumping to the end of the virtual machine function, and returning to the virtual machine.

In a third exemplary aspect of the present disclosure, a computer-readable non-transitory storage medium comprises executable instructions that, when executed by a computer system, cause the computer system to determine, by a hypervisor executing on a computer system, a first location in memory, corresponding to a physical address of a virtual machine function, determine, by the hypervisor, a second location in the memory of the virtual machine function, wherein the second location in the memory is offset from the first location in the memory of the virtual machine function, modify, by the hypervisor, the virtual machine function at the second location in the memory to include checking code, execute, by the hypervisor, the virtual machine function, while executing the virtual machine function, execute, by the hypervisor, the checking code, while executing the checking code, determine, by the hypervisor using the checking code, whether interrupts are disabled on a virtual machine, and responsive to determining that the interrupts are enabled on the virtual machine, at least one of disable, by the hypervisor using the checking code, the interrupts on the virtual machine and abort, by the hypervisor using the checking code, the virtual machine function. In accordance with another exemplary aspect of the present disclosure, which may be used in combination with any one or more of the preceding aspects, the hypervisor determines the second location in the memory by determining an address at which to include the checking code. In accordance with another exemplary aspect of the present disclosure, which may be used in combination with any one or more of the preceding aspects, the second location includes an address substantially immediately prior to an instruction to access a memory resource. In accordance with another exemplary aspect of the present disclosure, which may be used in combination with any one or more of the preceding aspects, the second location includes an address substantially immediately prior to an instruction to to switch to an alternate page view. In accordance with another exemplary aspect of the present disclosure, which may be used in combination with any one or more of the preceding aspects, the hypervisor determines whether interrupts are disabled by loading a flag register of the virtual machine and reading the register to determine a status of an interrupt flag. In accordance with another exemplary aspect of the present disclosure, which may be used in combination with any one or more of the preceding aspects, disabling the interrupts includes executing a clear interrupt instruction on the virtual machine. In accordance with another exemplary aspect of the present disclosure, which may be used in combination with any one or more of the preceding aspects, responsive to disabling the interrupts on the virtual machine, completing the execution of the virtual machine function and re-enabling the interrupts on the virtual machine. In accordance with another exemplary aspect of the present disclosure, which may be used in combination with any one or more of the preceding aspects, aborting the virtual machine function includes at least one of exiting to the hypervisor, jumping to the end of the virtual machine function, and returning to the virtual machine.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a memory;
   one or more processors, coupled to the memory;
   a virtual machine executing on the one or more processors; and
   a hypervisor executing on the one or more processors to:
   determine, by the hypervisor, a first location in the memory, corresponding to a physical address of a virtual machine function;
   determine, by the hypervisor, a second location in the memory of the virtual machine function, wherein the second location in the memory is offset from the first location in the memory of the virtual machine function;

modify, by the hypervisor, the virtual machine function at the second location in the memory to include checking code;

execute, by the hypervisor, the virtual machine function;

while executing the virtual machine function, execute, by the hypervisor, the checking code;

while executing the checking code, determine, by the hypervisor using the checking code, whether interrupts are disabled on a virtual machine; and responsive to determining that the interrupts are enabled on the virtual machine, at least one of disable, by the hypervisor using the checking code, the interrupts on the virtual machine and abort, by the hypervisor using the checking code, the virtual machine function.

2. The system of claim 1, wherein determining the second location in the memory further includes determining an address at which to include the checking code.

3. The system of claim 2, wherein the second location includes an address substantially immediately prior to an instruction to access a memory resource.

4. The system of claim 2, wherein the second location includes an address substantially immediately prior to an instruction to to switch to an alternate page view.

5. The system of claim 1, wherein the hypervisor determines whether interrupts are disabled by loading a flag register of the virtual machine and reading the register to determine a status of an interrupt flag.

6. The system of claim 1, wherein disabling the interrupts includes executing a clear interrupt instruction on the virtual machine.

7. The system of claim 1, further comprising responsive to disabling the interrupts on the virtual machine, completing the execution of the virtual machine function and re-enabling the interrupts on the virtual machine.

8. The system of claim 1, wherein aborting the virtual machine function includes at least one of exiting to the hypervisor, jumping to the end of the virtual machine function, and returning to the virtual machine.

9. A method comprising:

determining, by a hypervisor executing on a computer system, a first location in memory, corresponding to a physical address of a virtual machine function;

determining, by the hypervisor, a second location in the memory of the virtual machine function, wherein the second location in the memory is offset from the first location in the memory of the virtual machine function;

modifying, by the hypervisor, the virtual machine function at the second location in the memory to include checking code;

executing, by the hypervisor, the virtual machine function;

while executing the virtual machine function, executing, by the hypervisor, the checking code;

while executing the checking code, determining, by the hypervisor using the checking code, whether interrupts are disabled on a virtual machine; and responsive to determining that the interrupts are enabled on the virtual machine, at least one of disabling, by the hypervisor using the checking code, the interrupts on the virtual machine and aborting, by the hypervisor using the checking code, the virtual machine function.

10. The method of claim 9, wherein determining the second location in the memory further includes determining an address at which to include the checking code.

11. The method of claim 10, wherein the second location includes an address substantially immediately prior to an instruction to access a memory resource.

12. The method of claim 10, wherein the second location includes an address substantially immediately prior to an instruction to to switch to an alternate page view.

13. The method of claim 9, further comprising responsive to disabling the interrupts on the virtual machine, completing the execution of the virtual machine function and re-enabling the interrupts on the virtual machine.

14. The method of claim 9, wherein aborting the virtual machine function includes at least one of exiting to the hypervisor, jumping to the end of the virtual machine function, and returning to the virtual machine.

15. A computer-readable non-transitory storage medium comprising executable instructions that, when executed by a computer system, cause the computer system to:

determine, by a hypervisor executing on a computer system, a first location in memory, corresponding to a physical address of a virtual machine function;

determine, by the hypervisor, a second location in the memory of the virtual machine function, wherein the second location in the memory is offset from the first location in the memory of the virtual machine function;

modify, by the hypervisor, the virtual machine function at the second location in the memory to include checking code;

execute, by the hypervisor, the virtual machine function;

while executing the virtual machine function, execute, by the hypervisor, the checking code;

while executing the checking code, determine, by the hypervisor using the checking code, whether interrupts are disabled on a virtual machine; and responsive to determining that the interrupts are enabled on the virtual machine, at least one of disable, by the hypervisor using the checking code, the interrupts on the virtual machine and abort, by the hypervisor using the checking code, the virtual machine function.

16. The computer-readable non-transitory storage medium of claim 15, wherein determining the second location in the memory further includes determining an address at which to include the checking code.

17. The computer-readable non-transitory storage medium of claim 16, wherein the second location includes an address substantially immediately prior to an instruction to access a memory resource.

18. The computer-readable non-transitory storage medium of claim 16, wherein the second location includes an address substantially immediately prior to an instruction to to switch to an alternate page view.

19. The computer-readable non-transitory storage medium of claim 15, further comprising responsive to disabling the interrupts on the virtual machine, completing the execution of the virtual machine function and re-enabling the interrupts on the virtual machine.

20. The computer-readable non-transitory storage medium of claim 15, wherein aborting the virtual machine function includes at least one of exiting to the hypervisor, jumping to the end of the virtual machine function, and returning to the virtual machine.

* * * * *

UNITED STATES PATENT AND TRADEMARK OFFICE
CERTIFICATE OF CORRECTION

| | | |
|---|---|---|
| PATENT NO. | : 9,436,495 B2 | Page 1 of 1 |
| APPLICATION NO. | : 14/604056 | |
| DATED | : September 6, 2016 | |
| INVENTOR(S) | : Tsirkin et al. | |

It is certified that error appears in the above-identified patent and that said Letters Patent is hereby corrected as shown below:

In the Claims:

In column 13, line 25 (Claim 4), please replace "instruction to to switch to an alternate page view" with -- instruction to switch to an alternate page view --.

In column 14, line 9 (Claim 12), please replace "instruction to to switch to an alternate page view" with -- instruction to switch to an alternate page view --.

In column 14, line 52 (Claim 18), please replace "to to switch to an alternate page view" with -- to switch to an alternate page view --.

Signed and Sealed this
Eighth Day of November, 2016

Michelle K. Lee
*Director of the United States Patent and Trademark Office*